(12) United States Patent
Cho et al.

(10) Patent No.: US 10,116,511 B2
(45) Date of Patent: Oct. 30, 2018

(54) METHOD AND APPARATUS FOR CONTROLLING TOPOLOGY

(71) Applicants: Samsung Electronics Co., Ltd., Suwon-si, Gyeonggi-do (KR); Korea University Research and Business Foundation, Seoul (KR)

(72) Inventors: Chi-Hong Cho, Suwon-si (KR); Hwangnam Kim, Seoul (KR); Kangho Kim, Busan (KR); Hwantae Kim, Seoul (KR); Mungyu Bae, Pohang-si (KR); Suk Kyu Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 665 days.

(21) Appl. No.: 14/514,969

(22) Filed: Oct. 15, 2014

(65) Prior Publication Data
US 2015/0103695 A1   Apr. 16, 2015

(30) Foreign Application Priority Data
Oct. 15, 2013  (KR) .......................... 10-2013-0122861

(51) Int. Cl.
*H04L 12/24* (2006.01)
*H04L 29/12* (2006.01)

(52) U.S. Cl.
CPC .......... *H04L 41/12* (2013.01); *H04L 61/2038* (2013.01); *H04L 61/6004* (2013.01)

(58) Field of Classification Search
CPC .. H04L 41/12; H04L 61/2038; H04L 61/6004
See application file for complete search history.

(56) References Cited

U.S. PATENT DOCUMENTS

| | | | | |
|---|---|---|---|---|
| 7,835,301 B1* | 11/2010 | Maufer | ................ | H04W 24/02 |
| | | | | 370/254 |
| 2004/0233855 A1* | 11/2004 | Gutierrez | ............... | H04L 45/00 |
| | | | | 370/252 |
| 2006/0176863 A1 | 8/2006 | Robinson et al. | | |
| 2006/0193333 A1 | 8/2006 | Baughan et al. | | |

(Continued)

FOREIGN PATENT DOCUMENTS

| | | |
|---|---|---|
| EP | 1 665 658 B1 | 6/2006 |
| KR | 10-2007-0094433 A | 9/2007 |
| WO | 2012/140610 A1 | 10/2012 |

*Primary Examiner* — Derrick W Ferris
*Assistant Examiner* — Kevin H Lee
(74) *Attorney, Agent, or Firm* — Jefferson IP Law, LLP (57) ABSTRACT

A method and an electronic device for controlling a topology are provided. The method includes forming a star topology by directly connecting the electronic device to at least one node, and transmitting and receiving signals with neighboring nodes including the at least one node and determining whether to form the star topology or an extended star topology with the neighboring nodes based on a result of the transmitting and receiving, wherein the star topology is a topology in which the electronic device is directly connected to the neighboring nodes, and wherein the extended star topology is a topology in which the electronic device is directly connected to the neighboring nodes via an already connected node.

18 Claims, 10 Drawing Sheets

(56) References Cited

U.S. PATENT DOCUMENTS

| | | | |
|---|---|---|---|
| 2007/0286186 A1* | 12/2007 | Balandina | H04L 45/00 370/389 |
| 2008/0086464 A1* | 4/2008 | Enga | G06F 17/3087 |
| 2010/0191968 A1* | 7/2010 | Patil | H04L 9/3236 713/170 |
| 2012/0087377 A1 | 4/2012 | Lai | |
| 2013/0094404 A1 | 4/2013 | Van Wyk et al. | |
| 2014/0136660 A1* | 5/2014 | Ghai | H04L 12/2836 709/219 |
| 2014/0241367 A1* | 8/2014 | Ichino | H04L 45/02 370/392 |
| 2015/0365876 A1* | 12/2015 | Wang | H04L 45/12 370/315 |
| 2016/0128123 A1* | 5/2016 | Li | H04W 72/08 370/252 |

* cited by examiner

| ID 1 | ID 2 | ID 3 | ID 4 |

FIG.9

METHOD AND APPARATUS FOR CONTROLLING TOPOLOGY

CROSS-REFERENCE TO RELATED APPLICATION(S)

This application claims the benefit under 35 U.S.C. § 119(a) of a Korean patent application filed on Oct. 15, 2013 in the Korean Intellectual Property Office and assigned Serial number 10-2013-0122861, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Korea University Research and Business Foundation.

TECHNICAL FIELD

The present disclosure relates to an electronic device, and more particularly, to a method and apparatus for controlling a topology by using Z-wave.

BACKGROUND

As smart home research is being carried out, Machine to Machine (M2M) and Device to Device (D2D) communication technologies are emerging. Further, due to an excessive increase in mobile phone subscribers, mobile network operators are turning their eyes on the M2M technology which is communication between two or more objects and does not require a user's direct intervention. Using the M2M technology, an object can determine a situation without the user's intervention and can perform an appropriate operation according to the situation. For example, when the M2M technology is applied to a smart phone, the smart phone determines whether or not the user has arrived at home and controls an air conditioner or a lamp located at the user's house to operate by communicating with them.

As Internet Protocol version 6 (IPv6) is developed and can assign a unique IP address to each object, research on the M2M technology is being more actively carried out. Since a unique IP address is assigned to each object, each object can access the Internet and can transmit and/or receive data with other objects. As such, an Internet of Things is made possible, and various attempts to converge a variety of technologies such as M2M and the Internet of Things into a smart home service are being made.

Accordingly, there is a demand for research on a protocol such as Z-wave and for a method for communicating between objects more stably by using Z-wave and using low power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a Z-wave-based network topology in an electronic device.

Another aspect of the present disclosure is to provide a method and apparatus for determining whether to convert a network formed of a star topology into an extended star topology in an electronic device.

Another aspect of the present disclosure is to provide a method and apparatus for connecting nodes existing within a threshold range by using a star topology in an electronic device.

Another aspect of the present disclosure is to provide a method and apparatus for connecting nodes existing out of a threshold range by using an extended star topology in an electronic device.

Another aspect of the present disclosure is to provide a method and apparatus for converting a star topology and an extended star topology in an electronic device.

In accordance with to an aspect of the present disclosure, a method for controlling a network topology of an electronic device is provided. The method includes forming a star topology by directly connecting the electronic device to at least one node, transmitting and receiving signals with neighboring nodes including the at least one node, and determining whether to form the star topology or an extended star topology with the neighboring nodes based on a result of the transmitting and receiving, wherein the star topology is a topology in which the electronic device is directly connected to the neighboring nodes, and wherein the extended star topology is a topology in which the electronic device is directly connected to the neighboring nodes via an already connected node.

In accordance with another aspect of the present disclosure, an electronic device for controlling a network topology is provided. The device includes a communication module configured to transmit and receive signals with at least one node, and a topology determination module configured to form a star topology by directly connecting to at least one node, and to, based on a result of transmitting and receiving signals with neighboring nodes including the at least one node, determine whether to form the star topology or the extended star topology with the neighboring nodes, wherein the star topology is a topology in which the electronic device is directly connected to the neighboring nodes, and wherein the extended star topology is a topology in which the electronic device is directly connected to the neighboring nodes via an already connected node.

In accordance with another aspect of the present disclosure, a method for forming a network topology of an electronic device is provided. The method includes receiving, by the electronic device, a node research message from another electronic device, transmitting a response message to the other electronic device in response to the node search message, and broadcasting the node search message including address information of the electronic device.

In accordance with another aspect of the present disclosure, an electronic device for forming a network topology is provided. The electronic device includes a communication module configured to communicate with at least one another electronic device, and a controller configured, if a node search message is received from the other electronic device, to transmit a response message to the other electronic device in response to the node search message, and to broadcast the node search message including address information of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Hereinafter, a method for configuring a Z-wave-based network topology in an electronic device will be explained.

Hereinafter, an electronic device may be a controller for controlling at least one node (e.g., at least one different electronic device).

Figure 1:
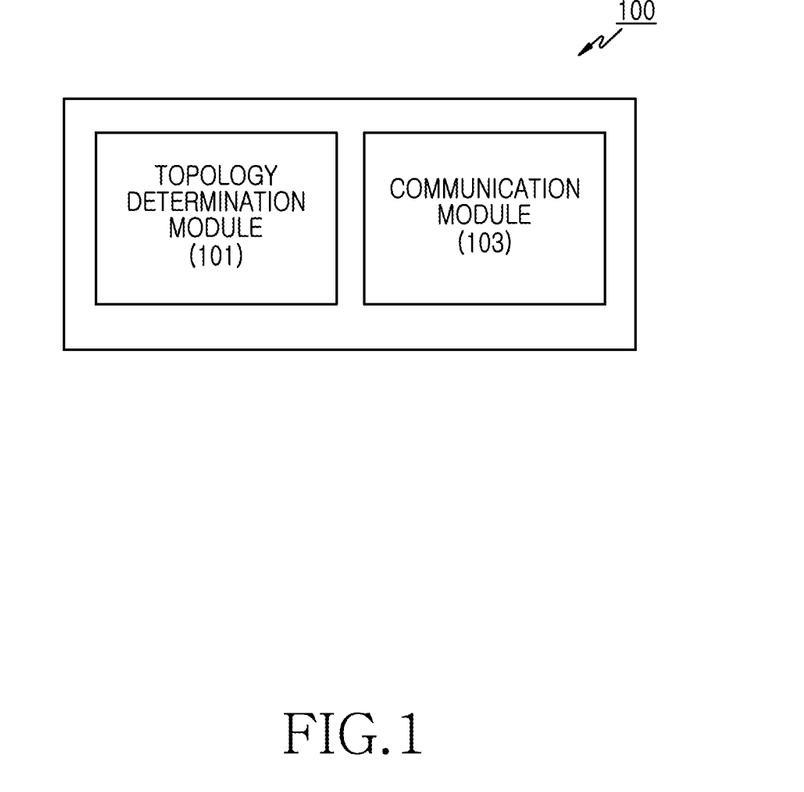
FIG. 1 is a view illustrating a block configuration of an electronic device for controlling a topology according to an embodiment of the present disclosure.

FIG. 1 is a view illustrating a block configuration of an electronic device for controlling a topology according to an embodiment of the present disclosure.

Referring to FIG. 1, an electronic device 100 may include a topology determination module 101 and a communication module 103.

The topology determination module 101 may determine a node to be added to a topology controlled by the electronic device 100 or a node to be removed from the topology. The topology recited herein refers a thing which physically connects network elements (e.g., nodes, etc.) to one another, or a connection method of network elements.

The topology determination module 101 may broadcast a message (e.g., a discovery message) for searching for a node every time a pre-set time arrives or if a pre-set event is detected. Thereafter, the topology determination module 101 may determine the node to be added or the node to be removed according to whether or not a message is transmitted and/or received.

First, if a message for a topology connection is received, the topology determination module 101 may determine whether to add a corresponding node to the topology based on whether or not the message for searching for the node is transmitted.

If the message for searching for the node is broadcasted and the message for the topology connection is received from a specific node as a response to the corresponding message, the topology determination module 101 may connect to the corresponding node. In other words, the topology determination module 101 may broadcast the message for searching for the node, and, if the message for the topology connection is received from a specific node as a response to the corresponding message, may identify a transmission node of the received message and determine whether information on the identified node exists in a pre-stored database. For example, if information on the identified node exists in the database, the topology determination module 101 may perform or maintain a connection with the corresponding node based on a star topology. In another example, if the information on the corresponding node does not exist in the pre-stored database, the topology determination module 101 may determine the corresponding node as an additional node, store information on the additional node in the database, and connect to the additional node based on the star topology.

On the other hand, if the message for the topology connection is received from a node to which the message for searching for the node is not transmitted, the topology determination module 101 may determine the corresponding node as an additional node, store information on the additional node in the database, and connect to the additional node based on an extended star topology. In this case, the extended star topology refers to a topology which configures a network by connecting to an additional node via an already connected another node without directly connecting to a node requiring connection.

In addition, if at least one message informing that a new node is added to the topology is received from a certain node, the topology determination module 101 may determine a path and a number of hops to the electronic device 100 from the new additional node based on the message which is received first, and may determine a topology to perform node connection. If the number of hops between the additional node and the electronic device 100 is one, the topology determination module 101 may connect to the additional node based on the star topology. On the other hand, if the number of hops between the additional node and the electronic device 100 is two or more, the topology determination module 101 may connect to the additional node based on the extended star topology.

In addition, the topology determination module 101 may assign a unique identification (ID) to the additional node. A method for assigning an ID to an additional node will be explained below with reference to drawings.

The topology determination module 101 may transmit the message for searching for the node and may determine whether or not to remove a corresponding node from the topology according to whether or not a response to the corresponding message is received. If the message for searching for the node is transmitted to a specific node, but a response to the corresponding message is not received from the specific node, the topology determination module 101 may determine the specific node as a node to be removed, may delete information on the specific node from the database, and may disconnect from the corresponding node.

In addition, if a message for removing a node is received from a removal node or a superordinate node to the removal node, the topology determination module 101 may identify the removal node based on the received message and may delete information on the corresponding node from the database.

The communication module 103 may transmit and/or receive a communication signal with at least one node.

The communication module 103 may broadcast a message for searching for a node every time a pre-set time arrives or if a pre-set event is detected.

In addition, the communication module 103 may receive a message for the topology connection from a specific node.

For example, the communication module 103 may transmit a message for searching for a node and may receive a message for the topology connection from a node which has received the corresponding message as a response to the corresponding message. In another example, if the communication module 130 does not transmit the message for searching for the node, the communication module 130 may receive a message for a topology connection from a certain node. In this case, the received message may include information on the node which has transmitted the corresponding message.

In addition, the communication module 103 may receive at least one message informing that a new node is added to the topology from a certain node, may determine an ID of the added node, and may transmit information on the determined ID to the added node. In this case, the received message may include information on a path from the added node to the electronic device 100 and information on the number of hops.

In addition, the communication module 103 may receive a message informing of a removal or an end of a node from a node to be removed or a superordinate node to the node to be removed.

Figure 2A:
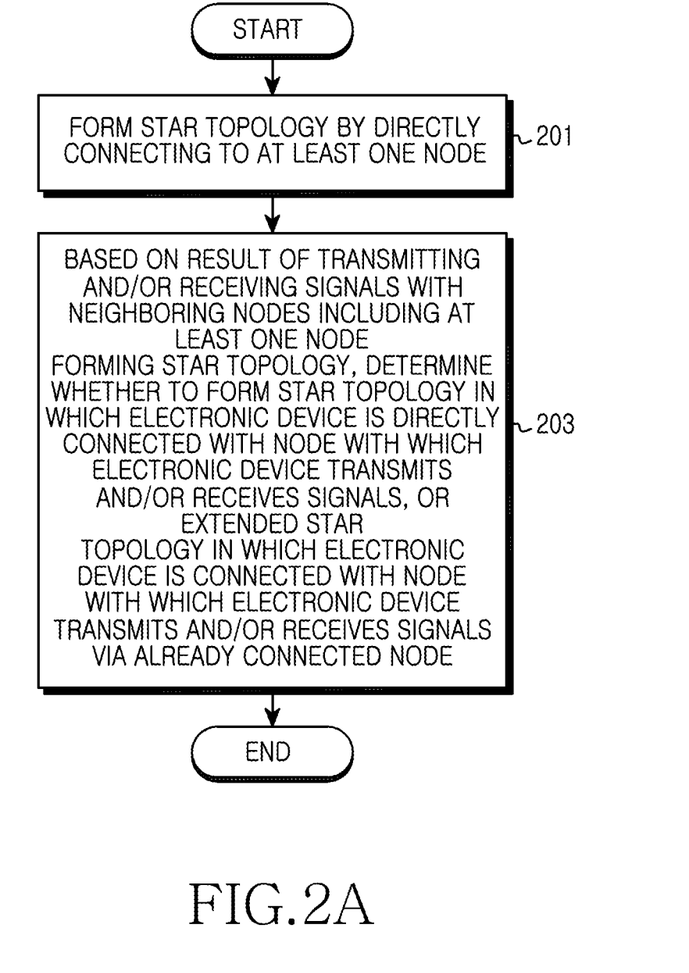
FIG. 2A is a view illustrating a procedure for determining a topology according to a result of transmitting and/or receiving signals in an electronic device according to an embodiment of the present disclosure.

FIG. 2A is a view illustrating a procedure for determining a topology according to a result of transmitting and/or receiving signals in an electronic device according to an embodiment of the present disclosure.

Referring to FIG. 2A, an electronic device may form a star topology by directly connecting to at least one node at operation 201. Specifically, the electronic device may be connected to a center of all network nodes and may form the star topology which directly controls connected nodes.

Thereafter, based on a result of transmitting and/or receiving signals with neighboring nodes including the at least one node forming the star topology, the electronic device may determine whether to form a star topology in which the electronic device is directly connected to the node with which the electronic device transmits and/or receives signals, or an extended star topology in which the electronic device is connected to the node with which the electronic device transmits and/or receives signals via an already connected node at operation 203.

If a message for searching for a node is transmitted and a message for a topology connection is received from a specific node as a response to the corresponding message, the electronic device may form the star topology by connecting to the corresponding node.

On the other hand, if a message for the topology connection is received from a node to which the message for searching for the node is not transmitted, the electronic device may form the extended star topology by connecting to the corresponding node.

The electronic device may transmit and/or receive data with nodes by using Z-wave.

Thereafter, the electronic device may finish the procedure according to the embodiment of the present disclosure.

Figure 2B:
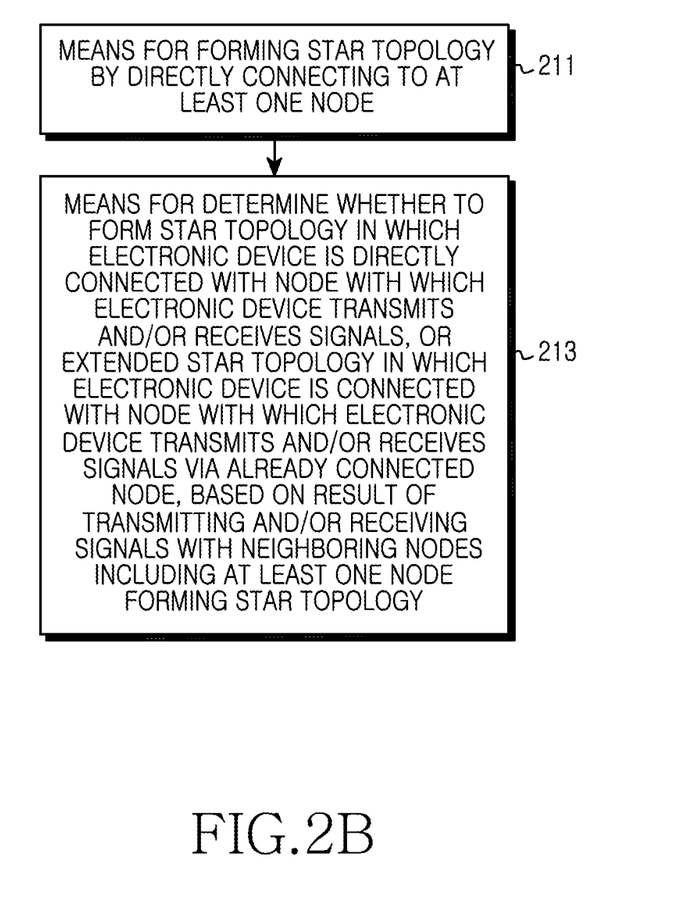
FIG. 2B is a view illustrating a means for determining a topology according to a result of transmitting and/or receiving signals in an electronic device according to an embodiment of the present disclosure.

FIG. 2B is a view illustrating a means for determining a topology according to a result of transmitting and/or receiving signals in an electronic device according to an embodiment of the present disclosure.

Referring to FIG. 2B, an electronic device may include a means 211 for forming a star topology by directly connecting to at least one node. In other words, the electronic device may include a means for connecting to at least one device or node which can be directly controlled by the electronic device based on the star topology.

In addition, the electronic device may include a means 213 for determining whether to form a star topology in which the electronic device is directly connected to a node with which the electronic device transmits and/or receives signals, or an extended star topology in which the electronic device is connected to a node with which the electronic device transmits and/or receives signals via an already connected node, based on a result of transmitting and/or receiving signals with neighboring nodes including the at least one node forming the star topology. In this case, the electronic device may include a means for broadcasting a message for searching for a node and a means for receiving a message for a topology connection from a node.

In addition, the electronic device may include a means for assigning a unique ID to a connected node.

Figure 3:
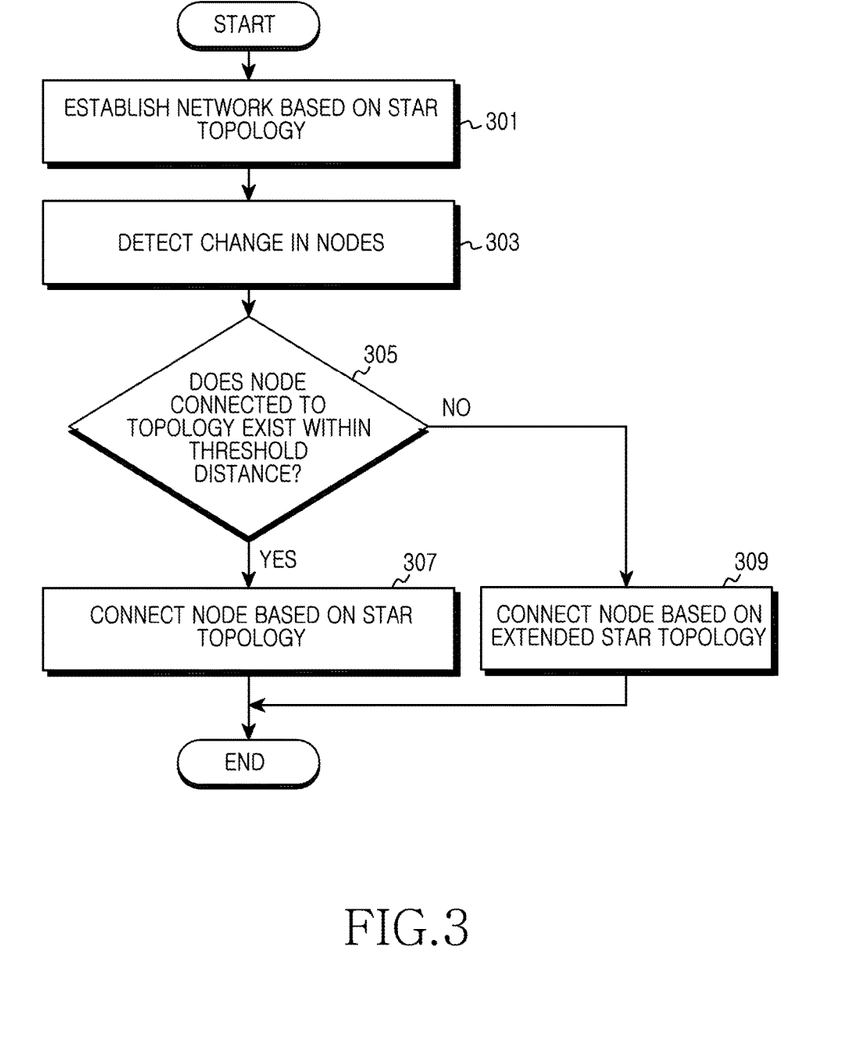
FIG. 3 is a view illustrating a procedure for determining a topology to connect a node if at least one node is detected in an electronic device according to an embodiment of the present disclosure.

FIG. 3 is a view illustrating a procedure for determining a topology to connect a node if at least one node is detected in an electronic device according to an embodiment of the present disclosure.

Referring to FIG. 3, an electronic device is illustrated, where the electronic device may establish a network based on a star topology at operation 301. Specifically, the electronic device may be connected to a center of all network nodes and may form a star topology which directly controls connected nodes.

Thereafter, the electronic device detects a change in nodes at operation 303. In other words, the electronic device may detect a node to be added to the topology or a node to be removed from the topology according to a result of transmitting and/or receiving data with nodes. In this case, the electronic device may transmit and/or receive data with nodes by using Z-wave.

Thereafter, the electronic device proceeds to operation 305 to determine whether or not the detected node exists within a threshold distance.

If the detected node exists within the threshold distance (YES in operation 305), the electronic device proceeds to operation 307 to connect the node based on a star topology. In other words, if the detected node exists within a communication range, the electronic device may connect the detected node existing within the communication range based on the star topology which directly connects to nodes.

Figure 4:
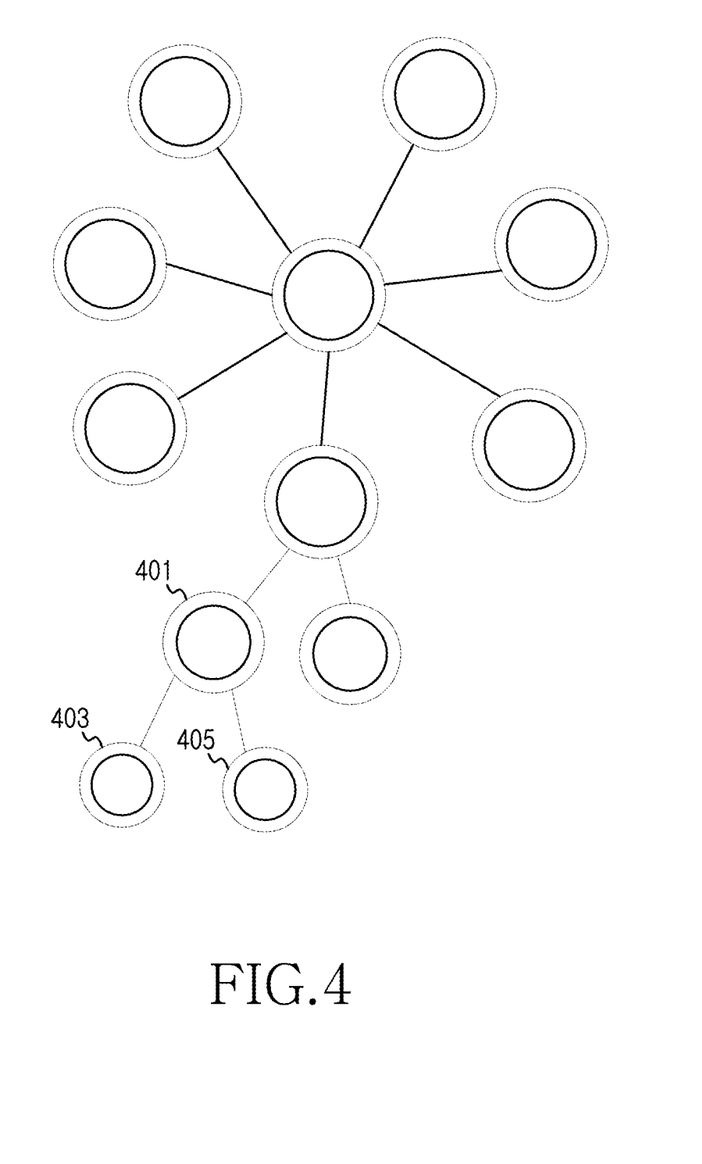
FIG. 4 is a view illustrating an example of an extended star topology for connecting to another node via an already connected node in an electronic device according to an embodiment of the present disclosure.

On the other hand, if the detected node does not exist within the threshold distance (NO in operation 305), the electronic device proceeds to operation 309 to connect the node based on an extended star topology. In other words, if the detected node does not exist within the communication range, the electronic device may connect the node which does not exist within the communication range based on the extended star topology which connects to other nodes 403 and 405 via an already connected node 401, as shown in FIG. 4, which is a view illustrating an example of an extended star topology for connecting to another node via an already connected node in an electronic device.

Thereafter, the electronic device may finish the procedure according to the embodiment of the present disclosure.

Figure 5:
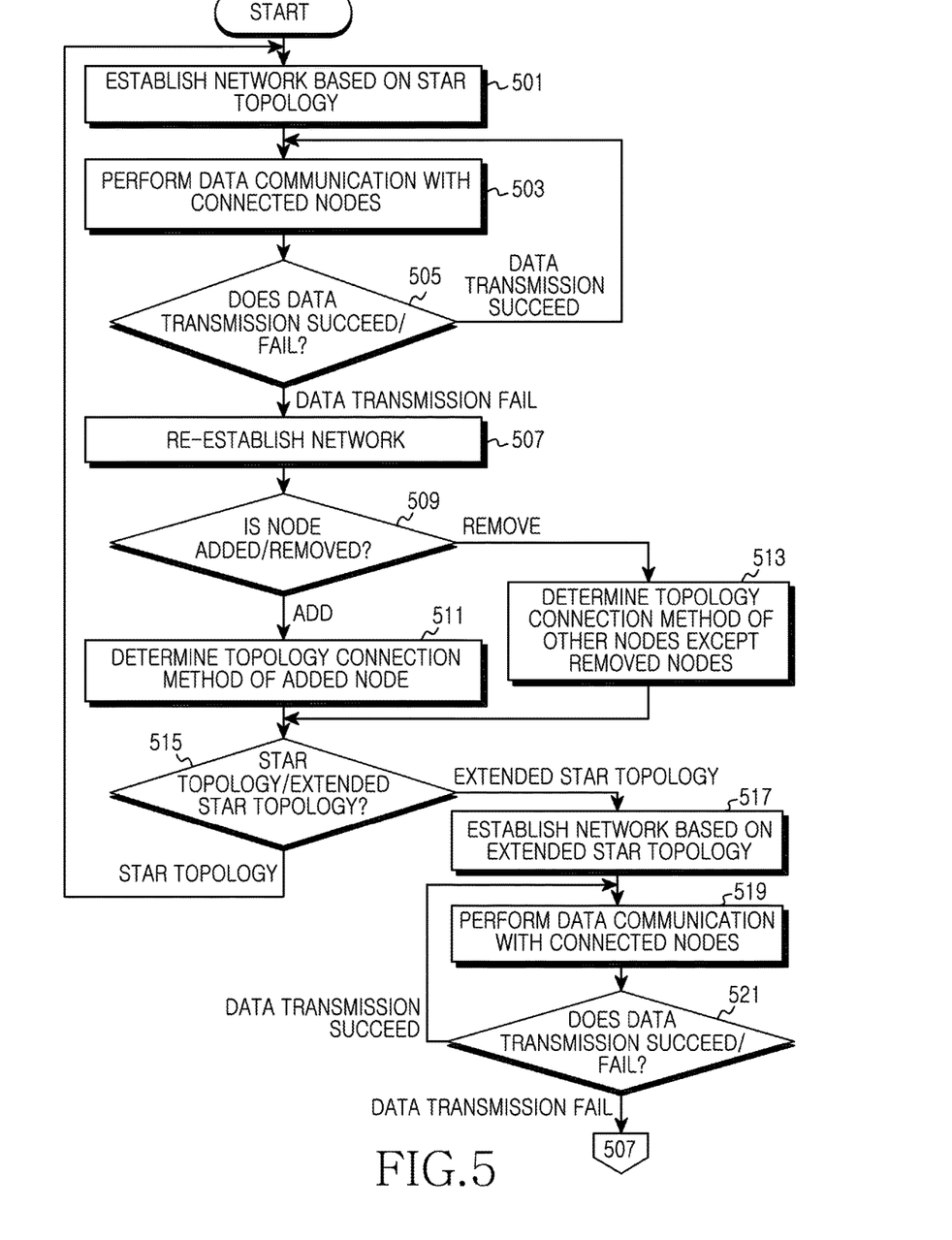
FIG. 5 is a view illustrating a procedure for determining a topology according to whether or not there is a change in nodes in an electronic device according to an embodiment of the present disclosure.

FIG. 5 is a view illustrating a procedure for determining a topology according to whether or not there is a change in nodes in an electronic device according to an embodiment of the present disclosure.

Referring to FIG. 5, an electronic device may establish a network based on a star topology at operation 501. Specifically, the electronic device may be connected to a center of all network nodes and may form a star topology which directly controls connected nodes.

Thereafter, the electronic device may perform data communication with connected nodes at operation 503. In this case, the electronic device may perform data communication with connected nodes by using Z-wave.

Thereafter, the electronic device proceeds to operation 505 to determine whether a data transmission succeeds or fails. For example, the electronic device may determine whether the data transmission succeeds or fails based on whether or not an acknowledgment (ACK) message is received in response to the transmitted data.

If the data transmission succeeds, the electronic device resumes operation 503 to re-perform the operations after operation 503.

On the other hand, if the data transmission fails, the electronic device proceeds to operation 507 to re-establish a network. In other words, if the data transmission fails, the electronic device may recognize that a problem related to a node or the data transmission has arisen and may re-establish a network.

Thereafter, the electronic device proceeds to operation 509 to determine whether an addition of a node is detected or a removal of a node is detected. For example, if the electronic device broadcasts a message for searching for a node, receives a message for a topology connection as a response to the corresponding message, and then node information included in the received message does not exist in a pre-stored database, the electronic device may determine that the corresponding node is added. In another example, if the electronic device broadcasts a message for searching for a node and a response to the corresponding message is not received from a specific node, the electronic device may determine that the corresponding node is deleted.

If the addition of a node is detected, the electronic device proceeds to operation 511 to determine a topology connection method of the added node. For example, the electronic device may determine whether the added node exists within a transmission and reception range of the electronic device based on data transmitted and/or received with the added node. Then, if the added node exists within the transmission and reception range of the electronic device, the electronic device may determine to connect the node based on a star topology, and, if the added node does not exist in the transmission and reception range of the electronic device, the electronic device may determine to connect the node based on an extended star topology.

On the other hand, if removal of a node is detected, the electronic device proceeds to operation 513 to determine a topology connection method of the other nodes except the removed node. For example, the electronic device may determine whether or not the other nodes except the removed node, that is, the remaining nodes, exist within the transmission and reception range of the electronic device 100 based on data transmitted and/or received with the remaining nodes. Then, if all of the remaining nodes exist within the transmission and reception range of the electronic device, the electronic device may determine to connect the remaining nodes based on a star topology, and, if some of the remaining nodes exist within the transmission and reception range of the electronic device and some of the remaining nodes do not exist within the transmission and reception range of the electronic device, the electronic device may determine to connect the remaining nodes based on an extended star topology.

Thereafter, the electronic device proceeds to operation 515 to determine whether the topology connection method determined according to whether a node is added or removed is a star topology or an extended star topology. If the determined topology connection method is the star topology, the electronic device resumes operation 501 to re-perform the operations after operation 501.

On the other hand, if the determined topology connection method is the extended star topology, the electronic device proceeds to operation 517 to establish a network based on the extended star topology. In other words, the electronic device may detect a change in nodes, and may determine at least one of the star topology and the extended star topology to connect nodes. A method for determining a topology connection method according to a change in nodes will be explained below with reference to FIGS. 6 and 7.

Thereafter, the electronic device proceeds to operation 519 to perform data communication with connected nodes. In this case, the electronic device may perform data communication with connected nodes by using Z-wave.

Thereafter, the electronic device proceeds to operation 521 to determine whether a data transmission fails or succeeds.

If the data transmission succeeds, the electronic device resumes operation 519 to re-perform the operations after operation 519.

On the other hand, if the data transmission fails, the electronic device resumes operation 507 to re-perform the operations after operation 507.

Figure 6:
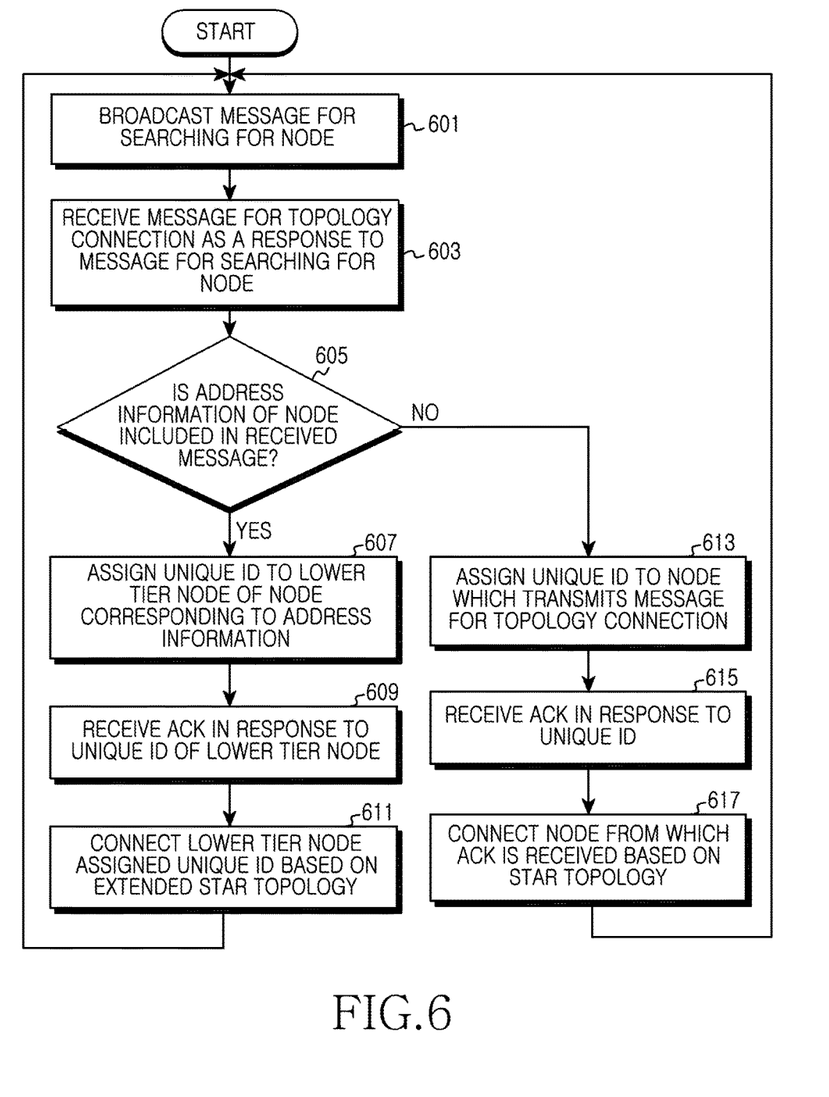
FIG. 6 is a view illustrating a procedure for assigning a unique identification (ID) to a connected node in an electronic device according to an embodiment of the present disclosure.

FIG. 6 is a view illustrating a procedure for assigning a unique ID to a connected node in an electronic device according to an embodiment of the present disclosure.

Referring to FIG. 6, an electronic device may broadcast a message for searching for a node at operation 601. For example, the electronic device may broadcast a discovery message to neighboring nodes.

Thereafter, the electronic device may receive a message for a topology connection as a response to the message for searching for the node at operation 603. For example, the electronic device may transmit a discovery message for searching for a node to neighboring nodes, and may receive a discovery response message or an ACK message for the topology connection as a response to the discovery message from a node which has received the discovery message. Herein, each of the neighboring nodes which have received the discovery message may transmit the discovery response message to the electronic device and may include their own address information in the discovery message and may broadcast the discovery message to neighboring nodes. This is to search other nodes existing out of a data transmission and reception area of the electronic device. In this case, each of the neighboring nodes which has already received the discovery message may disregard the discovery message received from other nodes. On the other hand, each of the neighboring nodes which has not received the discovery message may transmit a discovery response message including the address information included in the discovery message as a response to the discovery message received from other nodes.

Thereafter, the electronic device proceeds to operation 605 to determine whether the received message includes address information of another node.

Figure 8:
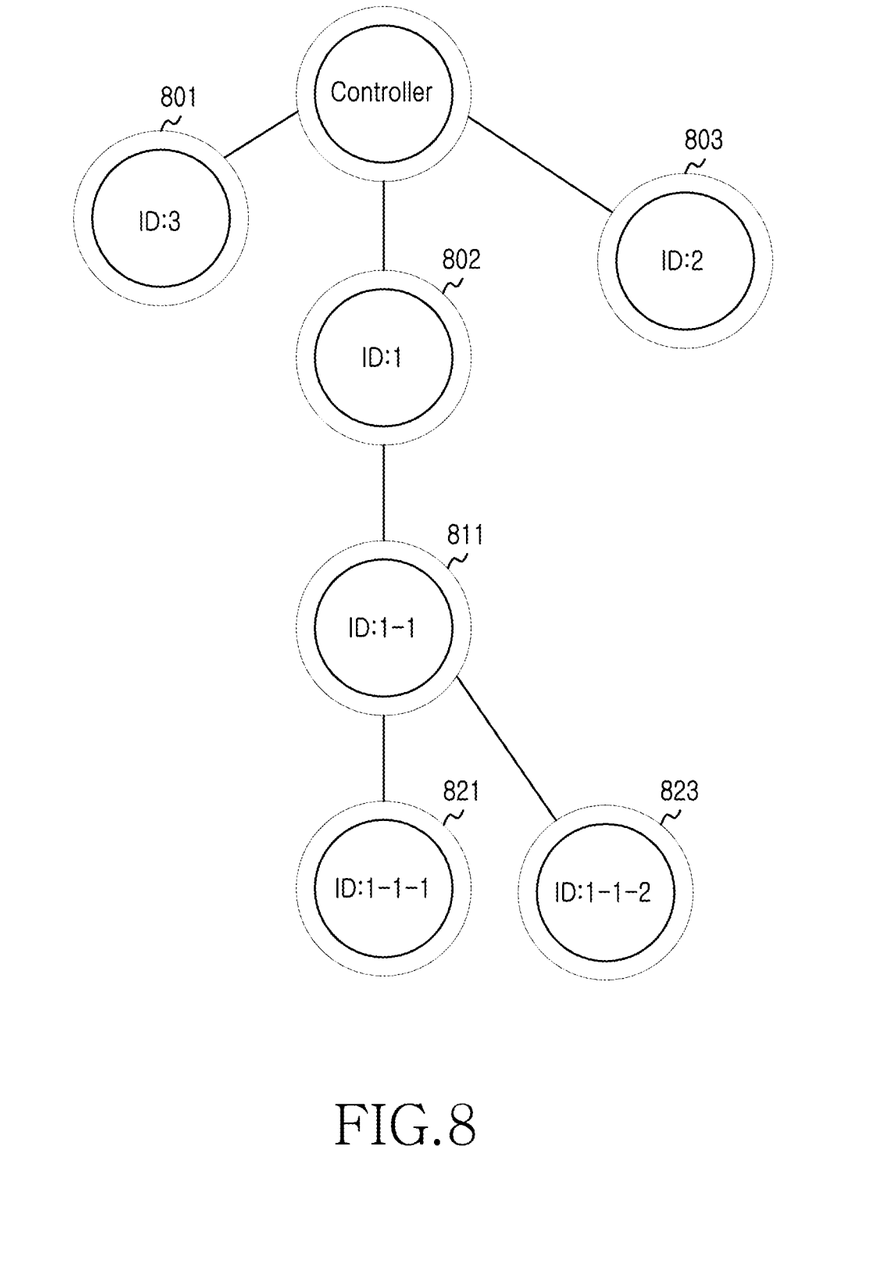
FIG. 8 is a view illustrating an example of a method for assigning a fixed ID in an electronic device according to an embodiment of the present disclosure.

If the received message does not include address information of another node (NO in operation 605), the electronic device proceeds to operation 613 to assign a unique ID to the node which has transmitted the message for the topology connection. For example, if a message for the topology connection received from a first node does not include address information of another node, the electronic device may determine that the first node exists within the data transmission and reception area of the electronic device and is a node with which the electronic device can directly transmit and/or receive data, may assign a unique ID to the first node, and then may transmit the assigned ID to the first node. According to an embodiment of the present disclosure, the electronic device may assign IDs of a first tier to nodes with which the electronic device can directly transmit and/or receive data. For example, as shown in FIG. 8, which illustrates an example of a method for assigning a fixed ID in an electronic device according to an embodiment of the present disclosure, nodes which directly communicate with the electronic device serving as a controller may be assigned IDs of the first tier expressed as single numbers like 1, 2, and 3 (e.g., see reference elements 801, 802, 803, as illustrated in FIG. 8).

Thereafter, the electronic device may receive an ACK in response to the unique ID at operation 615. If a unique ID is assigned to a specific node, but an ACK is not received in response to the unique ID, the electronic device may re-transmit the unique ID to the specific node a predetermined number of times to receive the ACK.

Thereafter, the electronic device proceeds to operation 617 to connect the node from which the ACK is received to a star topology. Specifically, the electronic device may directly connect to the corresponding node based on the star topology.

Thereafter, the electronic device resumes operation 601 to re-perform the operations after operation 601.

Figure 9:
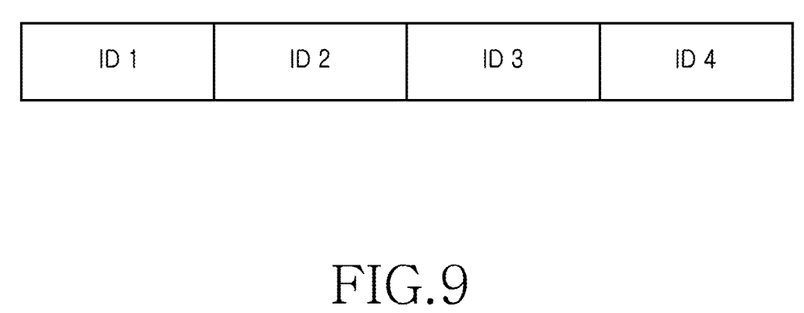
FIG. 9 is a view illustrating a fixed ID system of a topology in an electronic device according to an embodiment of the present disclosure.

As a result of determining at operation 605, if the received message includes address information of another node (YES at operation 605), the electronic device may determine that the received message is a message that is received from still another node which has received the discovery message from another node corresponding to the address information, and may assign still another node a unique ID indicating that still another node which is a transmission node of the received message is a subordinate node to another node corresponding the address information at operation 607. For example, if a message received from a second node includes address information of a first node, the electronic device may determine that the second node exists out of the data transmission and reception area of the electronic device and thus cannot directly transmit and/or receive data with the electronic device and can transmit and/or receive data with the electronic device via the first node existing within the data transmission and reception area of the electronic device, may determine the second node as a subordinate node to the first node, that is, a second tier node, and then may assign a lower tier ID related to the ID assigned to the first node to the second node. The electronic device may transmit the lower tier ID assigned to the second node to the second node via the first node. For example, if the ID assigned to the first node is "1", the lower tier IDs related to "1" may have a form derived from "1", like "1-1, 1-2, 1-3, . . . 1-9". If the ID assigned to the first node is "1-1", the lower tier IDs related to "1-1" may have a form derived from "1-1" like "1-1-1, 1-1-2, 1-1-3, . . . , 1-1-9". For example, as shown in FIG. 8, if the ID assigned to the first node is "ID: 1 (801)", the electronic device may assign the second node communicating with the electronic device via the first node "ID: 1-1 (811)". In another example, if the ID assigned to the first node is "ID: 1 (801)" and the ID assigned to the second node is "ID: 1-1 (811)", the electronic device may assign a third node and a fourth node communicating with the electronic device via the first node and the second node "ID: 1-1-1 (821)" and "ID: 1-1-2 (823)", respectively. If the IDs are assigned in this way, the ID structure may be as shown in FIG. 9, which illustrates a fixed ID system of a topology in an electronic device according to an embodiment of the present disclosure. For example, the ID structure configured with reference to four (4) hops may include four (4) fields (or memory cells) in which "ID1-ID2-ID3-ID4 " are recorded in sequence, as shown in FIG. 9. For example, if the ID assigned to the first node is "1", the ID "1" of the first node may be recorded on the "ID 1" field, which is the first field of the four fields, and if the ID assigned to the fourth node is "1-1-2", the first "1" of the ID of the first node may be recorded on the ID1 field, the second "1" may be recorded on the ID2 field, and the third "2" may be recorded in the ID3 field. In this way, the ID structure may be a fixed structure. According to another embodiment, in an ID structure configured with reference to four (4) hops, each of "ID1-ID2-ID3-ID4" may be formed of n bits. For example, if the ID assigned to the first node is "1", an ID structure of the first node may be "0000 0000 0000 0001", and if the ID assigned to the fourth node is "1-1-2", an ID structure of the second node may be "0000 0010 0001 0001".

Thereafter, the electronic device may receive an ACK in response to the assigning of the ID from the lower tier node at operation 609. If the unique ID is assigned to the lower tier node, but the ACK is not received in response to the unique ID, the electronic device may re-transmit the unique ID to the lower tier node a predetermined number of times to receive the ACK.

Thereafter, the electronic device proceeds to operation 611 to connect the lower level node to which the unique ID is assigned based on an extended star topology. Specifically, the electronic device may connect to the lower level node via an already connected node based on the extended star topology.

Thereafter, the electronic device resumes operation 601 to re-perform the operations after operation 601.

In the above example, a method for assigning an ID of a fixed structure has been described. However, according to an embodiment of the present disclosure, a dynamic ID may be assigned. For example, a pre-set identifier value may be used to indicate which node is connected with a node having a corresponding ID, that is, which node allows the node to communicate with the electronic device serving as a controller. If Hex data is used and the identifier value is set to AF, an identifier may exist in the $10^{th}$ bit and the $15^{th}$ bit, and, if the identifier value is set to 14C, an identifier may exist in the $1^{st}$ bit, $4^{th}$ bit, and $12^{th}$ bit. The hierarchy may be classified by such an identifier value. If the ID is assigned by the identifier as described above, the hierarchy can be classified freely in comparison with the fixed ID structure. Therefore, even if many nodes exist in a specific level, the ID can be actively assigned.

As described above, by assigning nodes which do not directly communicate with the electronic device and communicate via a specific node an ID indicating that the nodes are subordinate to the specific node, a path to reach a destination node can be indicated based on the ID, and thus routing can be performed without requiring a separate routing table.

Figure 7:
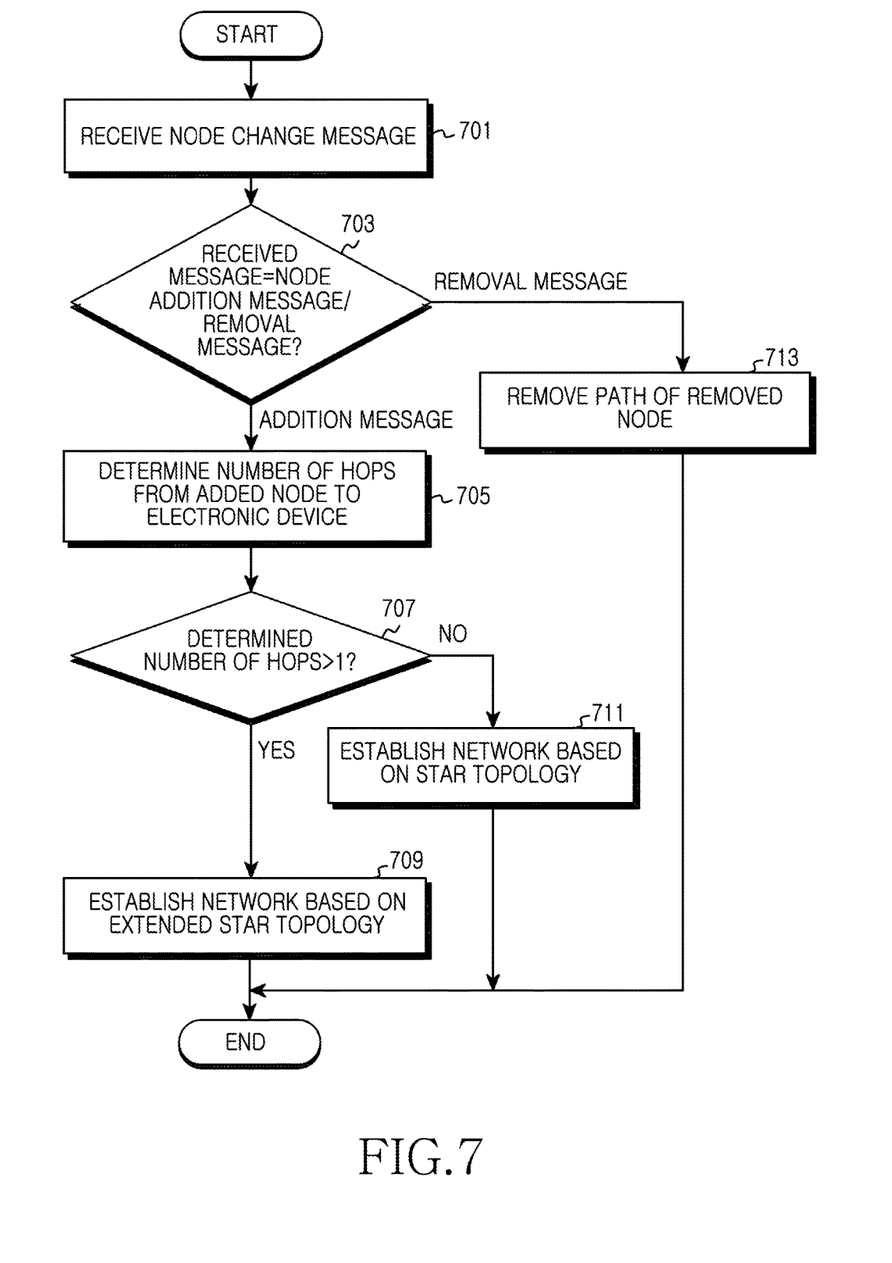
FIG. 7 is a view illustrating a procedure for determining a topology according to a number of hops from a node to an added node in an electronic device according to an embodiment of the present disclosure.

FIG. 7 is a view illustrating a procedure for determining a topology according to a number of hops from a node to an added node in an electronic device according to an embodiment of the present disclosure.

Referring to FIG. 7, an electronic device may receive a node change message at operation 701. The electronic device may receive a message informing that a new node is added or a message informing that a specific node is removed from a node constituting an already formed network topology. In addition, the electronic device may directly receive a message informing of an addition of a node from a new node which does not constitute the already formed network topology, and may directly receive a message informing of an end of a specific node from the specific node constituting the already formed network topology. For example, if a specific node is added to a network, the specific node may transmit a start message informing of its existence to neighboring nodes, and the neighboring nodes may include their own address information in the start message and may forward the start message to the electronic device serving as a controller of the already formed network topology. In another example, if a specific node is removed from an already formed network, the specific node may transmit an end message informing of its end to neighboring nodes, and the neighboring nodes may include their own address information in the end message and may forward the end message to the electronic device serving as a controller of the already formed network topology.

Thereafter, the electronic device proceeds to operation 703 to determine whether the received message is a node addition message or a node removal message.

If the received message is the node addition message, the electronic device proceeds to operation 705 to determine a number of hops from the added node to the electronic device. For example, the added node may set the number of hops to 1 in the start message for informing its existence and may transmit the start message to neighboring nodes. If the neighboring nodes forward the received start message, the neighboring nodes may increase the number of hops of the corresponding message by 1. Accordingly, the electronic device may determine the number of hops from the added node to the electronic device 100 based on the number of hops included in the received message.

Thereafter, the electronic device determines whether or not the determined number of hops is greater than 1 at operation 707. If the determined number of hops is greater than 1 (YES in operation 707), the electronic device proceeds to operation 709 to form a network based on the added node and the extended star topology.

Thereafter, the electronic device may finish the procedure according to the embodiment of the present disclosure.

On the other hand, as a result of determining at operation 707, if the determined number of hops is 1 (NO in operation 707), the electronic device proceeds to operation 711 to form a network based on the added node and the star topology.

Thereafter, the electronic device may finish the procedure according to the embodiment of the present disclosure.

As a result of determining at operation 703, if the received message is the node removal message, the electronic device proceeds to operation 713 to remove a path of the removed node.

Thereafter, the electronic device may finish the procedure according to the embodiment of the present disclosure.

The various embodiments and all function operations described in the present disclosure may be implemented by computer software, firmware, or hardware, or a combination of one or more of them, including the configuration disclosed in the present disclosure and equivalent configurations. In addition, the various embodiments described in the present disclosure may be implemented by one or more modules of computer program instructions executed by one or more computer program products, that is, a data processing device, or encoded on a computer-readable medium for controlling the operation of this device.

The computer-readable medium may be a machine-readable storage medium, a machine-readable storage substrate, a memory device, a configuration of a material influencing a machine-readable radio-wave stream, or a combination of one or more of them. The term "data processing device" includes a programmable processor, a computer, or any apparatus, device, and machine for processing data, including a multi-processor or computer. The apparatus may include a code which is added to hardware and generates an execution environment for a corresponding computer program, for example, a code constituting processor firmware, a protocol stack, a database management system, an operating system, or a combination of one or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   broadcasting a discovery message for detecting a first node adjacent to the electronic device from among a plurality of nodes;
   receiving, from the first node, a first response message including first address information of the first node, wherein the first response message is broadcasted from the first node in response to receiving the discovery message, and wherein the broadcasted first response message is received at a second node which is located to the first node and departed from the electronic device;
   in response to receiving of the first response message, allocating, to the first node, a first identification (ID) having a first hierarchical level, wherein the first ID is used for indicating that the first node is next to the electronic device;
   receiving, from the first node, a second response message including both the first address information and second address information of the second node that is transmitted from the second node to the first node in response to receiving the broadcasted first response message at the second node;
   in response to receiving of the second response message, allocating a second ID having a second hierarchical level for indicating that the second node is next to the first node, wherein the second ID is used for indicating both the first address information and the second address information,
   wherein the second ID includes an additional number subordinating to a number of the first ID.

2. The method of claim 1, wherein the electronic device and the plurality of nodes are communicating based on Z-wave protocol.

3. The method of claim 1, further comprising:
   in response to allocating the first ID to the first node, transmitting, to the first node, information for indicating that the first ID is allocated to the first node; and
   receiving, from the first node, ACK message indicating that the first node received the information for indicating that the first ID is allocated to the first node.

4. The method of claim 1, further comprising:
   in response to allocating the second ID to the second node, transmitting, to the second node through the first node, information for indicating that the second ID is allocated to the second node; and
   receiving, from the first node, ACK message indicating that the second node received the information for indicating that the second ID is allocated to the second node,
   wherein the ACK message received from the first node is generated by the second node in response to receiving of the information at the second node.

5. The method of claim 1, further comprising:
   recognizing, by using the second ID subordinating to the first ID, that a transmission path of data to be transmitted is started from the electronic device through the first node and ended at the second node; and
   transmitting, to the second node, the data to be transmitted.

6. The method of claim 1,
   wherein the first identification corresponding to the first node which is located adjacent to the electronic device includes a single number, and
   wherein the second identification corresponding to the second node which is located adjacent to the first node includes two number.

7. The method of claim 1,
   wherein a first network topology includes the electronic device and the first node which is located adjacent to the electronic device,
   wherein a second network topology includes the electronic device, the first node which is located adjacent to the electronic device, and the second node which is located adjacent to the first node and is departed from the electronic device, and
   wherein the first network topology corresponds to a star topology and the second network topology corresponds to an extended star topology.

8. The method of claim 1, wherein the second ID is configured to recognize a presence of the second node next to the first node.

9. The method of claim 5, further comprising:
   receiving, from at least one of the first node or the second node, a terminating message for indicating disconnecting a connection between the electronic device and the at least one of the first node or the second node; and
   removing the at least one of the first node or the second node which transmits the terminating message from a memory storing the first node and the second node.

10. A method for operating an electronic device,
    a memory storing instruction; and
    a processor, operatively connected to the memory, configured to execute the instruction to:
       broadcast a discovery message for detecting a first node adjacent to the electronic device from among a plurality of nodes,
       receive, from the first node, a first response message including first address information of the first node, wherein the first response message is broadcasted from the first node in response to receiving the discovery message, and wherein the broadcasted first response message is received at a second node which is located to the first node and departed from the electronic device,
       in response to receiving of the first response message, allocate, to the first node, a first identification (ID) having a first hierarchical level, wherein the first ID is used for indicating that the first node is next to the electronic device,
       receive, from the first node, a second response message including both the first address information and second address information of the second node that is transmitted from the second node to the first node in response to receiving the broadcasted first response message at the second node, and in response to receiving of the second response message, allocate a second ID having a second hierarchical level for indicating that the second node is next to the first node, wherein the second ID is used for indicating both the first address information and the second address information,
wherein the second ID includes an additional number subordinating to a number of the first ID.

11. The electronic device of claim 10, wherein the electronic device and the plurality of nodes are communicating based on Z-wave protocol.

12. The electronic device of claim 10, wherein the processor is further configured to:
in response to allocating the first ID to the first node, transmit, to the first node, information for indicating that the first ID is allocated to the first node; and
receive, from the first node, ACK message indicating that the first node received the information for indicating that the first ID is allocated to the first node.

13. The electronic device of claim 10,
wherein the processor is further configured to:
in response to allocating the second ID to the second node, transmit, to the second node through the first node, information for indicating that the second ID is allocated to the second node, and
receive, from the first node, ACK message indicating that the second node received the information for indicating that the second ID is allocated to the second node, and
wherein the ACK message received from the first node is generated by the second node in response to receiving of the information at the second node.

14. The electronic device of claim 10, wherein the processor is further configured to:
recognize, by using the second ID subordinating to the first ID, that a transmission path of data to be transmitted is started from the electronic device through the first node and ended at the second node, and
transmit, to the second node, the data to be transmitted.

15. The electronic device of claim 10,
wherein the first identification corresponding to the first node which is located adjacent to the electronic device includes a single number, and
wherein the second identification corresponding to the second node which is located adjacent to the first node includes two number.

16. The electronic device of claim 10,
wherein a first network topology includes the electronic device and the first node which is located adjacent to the electronic device,
wherein a second network topology includes the electronic device, the first node which is located adjacent to the electronic device, and the second node which is located adjacent to the first node and is departed from the electronic device, and
wherein the first network topology corresponds to a star topology and the second network topology corresponds to an extended star topology.

17. The electronic device of claim 10, wherein the second ID is configured to recognize a presence of the second node next to the first node.

18. The electronic device of claim 14, wherein the processor is further configured to:
receive, from at least one of the first node or the second node, a terminating message for indicating disconnecting a connection between the electronic device and the at least one of the first node or the second node, and
remove the at least one of the first node or the second node which transmits the terminating message from a memory storing the first node and the second node.

* * * * *